March 25, 1969     E. WEISS     3,434,356

SHAFT POSITION LIMITING DEVICE

Filed April 26, 1967

INVENTOR.
ERNEST WEISS
BY *Herbert L. Davis*

ATTORNEY

# United States Patent Office 3,434,356
Patented Mar. 25, 1969

3,434,356
SHAFT POSITION LIMITING DEVICE
Ernest Weiss, Maywood, N.J., assignor to The Bendix Corporation, a corporation of Delaware
Filed Apr. 26, 1967, Ser. No. 633,915
Int. Cl. F16h 35/18
U.S. Cl. 74—10.2                              11 Claims

ABSTRACT OF THE DISCLOSURE

A device for limiting rotation of an output shaft to a predetermined angle yet providing for overrun of an input shaft beyond the predetermined angle. The input shaft and output shaft are drivably connected by a shaft-lock during rotation within the predetermined angle. When the output shaft is rotated through the predetermined angle the shaftlock locks the output shaft against further rotation and disconnects the input shaft from the output shaft to permit overrun of the input shaft. Upon return of the input shaft to the predetermined angle the shaftlock unlocks the output shaft and drivably reconnects it to the input shaft.

BACKGROUND OF THE INVENTION

Field of the invention

This invention relates to a shaft position limiting device for stopping and positioning a shaft in a predetermined position, the shaft having elements thereon for engagement with a stop and lock means, and the shaft being operative to drive a servomechanism, synchro, potentiometer or similar electrical device.

Description of the prior art

Gear trains, such as used in analog computers, drive various electromechanical rotary components. A potentiometer, synchro or similar device is usually driven a certain number of revolutions to accomplish a particular analog function while yet being required to stop after an interval or certain number of turns of the electrical device although the gear train driving this system continues to rotate.

Further, upon counter rotation of the input gear train, it is often desired that the electrical device does not immediately rotate back to its initial starting position at the beginning of the counter rotation. More specifically, the input gear train may initially rotate an electrical device such as a potentiometer the maximum number of turns such a device allows.

Assume that the maximum number of turns of the electrical device is reached in the ten revolutions of the input shaft from start up whereby a bidirectional locking device of a type referred to hereinafter is used to stop rotation of the output shaft subsequent to the input shaft angular displacement of ten revolutions which action also stops the electrical device although the input shaft and gear train continue to rotate.

The input shaft may continue to rotate, for example, up to 100 revolutions after which the direction of rotation of the input shaft may be reversed. At the beginning of this counter rotation it is often desired that counter rotation of the electrical device such as a potentiometer does not immediately begin and conclude on the first ten revolutions of the counter rotation. More particularly, in the example, the counter rotation from the 100th revolution back to the 10th revolution should not cause the potentiometer shaft to counter rotate, but rather in such counter rotation from the 10th revolution back to zero, the point of starting should be the interval of counter rotation of the potentiometer. That is, in the example, counter rotation of the electrical device should not occur until 90 counter revolutions of the input shaft takes place after which the input shaft then may drive the output shaft and potentiometer back to the initial position.

Heretofore, the prior art has only accomplished the function of stopping an output shaft after a predetermined number of revolutions of an input shaft or gear train. For example, a typical shaft lock or bidirectional locking device, as shown and described in the U.S. Patent No. 3,232,124 by G. A. Weber, allows rotary motion of an input shaft 11 to drive an output shaft 17 a predetermined number of revolutions, at which time the input shaft may continue to rotate without rotation of the output shaft 17.

In the device of the Weber patent, the operative arrangement may be such that the output shaft may stop after ten revolutions of the input shaft in an initial sense, for example, while the input shaft may continue to be rotated in said initial sense. Upon counter rotation of the input shaft, the output shaft of the aforementioned Weber patent immediately becomes unlocked and immediate counter rotation occurs.

The subject invention provides a simple mechanical structure to prohibit this immediate counter rotation of the output shaft until after a number of counter revolutions equal to the over rotation of the input shaft in the initial sense. The invention provides a conventional intermittent rotary motion drive having an input thereof driven directly by a gear train from the input of the shaft lock and having an output shaft of the intermittent drive controlling engagement of a pair of locking disks to prohibit the aforementioned immediate unlocking of the output shaft of the bidirectional shaft lock upon the counter rotation of the input shaft thereof. Moreover, the operative arrangement in the present invention is such that the number of counter revolutions of the input shaft during which counter rotation of the electrical device is prohibited is substantially the same number of revolutions as that made by the input shaft beyond the initial input revolutions required to effect the full rotary adjustment of the electrical device.

SUMMARY OF THE INVENTION

It is within the contemplation of the invention to provide a means to slave a rotatably driven output shaft to a driving input shaft upon rotation thereof in one direction for a predetermined number of revolutions and to initially lock the output shaft thereafter in a fixed position although the input shaft may continue to rotate in the one direction for a selected number of revolutions and other means to maintain the output shaft in a locked position for a number of revolutions of the input shaft in an opposite direction corresponding to said selected number of revolutions of the input shaft in the one direction following the initial locking of the output shaft.

Further, an object of this invention is to provide a shaft positioning device having an input shaft and an operative arrangement to drive in one direction an output shaft for a predetermined number of revolutions, together with releasable means to thereafter lock the output shaft, the operative arrangement of the device being such that the input shaft may continue to be rotated in the one direction in excess of said predetermined number of revolutions, an intermittent drive means being thereupon effective to control the position of a locking disk so as to prohibit counter rotation of the output shaft of the shaft positioning device upon counter rotation of the input shaft in a direction opposite to the one direction until the completion of a counter rotation of the input shaft equal to the initial rotation thereof in excess of said predetermined number of revolutions.

A further object of the invention is to provide an intermittent motion driving mechanism having an input shaft mounted for rotation and means driven by said input shaft to provide an intermittent rotation of an output shaft which mounts a locking disk rotatable therewith, and the locking disk being arranged to releasably engage with another locking disk mounted on a locking shaft of a bidirectional locking device.

A further object of this invention is to provide a bidirectional locking device having a rotatable output shaft, the rotation of which is controlled by an output locking shaft including locking means rendered effective by an angular position of an output shaft of an intermittent rotary motion drive, both the bidirectional locking device and intermittent drive having input shafts in gear driving relationship and operatively driven by a common prime mover.

A further object of this invention is to provide an intermittent rotary motion drive having a locking disk mounted thereon controlling rotational displacement of an output locking shaft of a bidirectional locking device in accordance with a predetermined angular displacement of a rotatable input shaft of the bidirectional locking device.

These and other objects and features of the invention are pointed out in the following description in terms of the embodiment thereof which is shown in the accompanying drawings.

DESCRIPTION OF THE INVENTION

Figure 1:
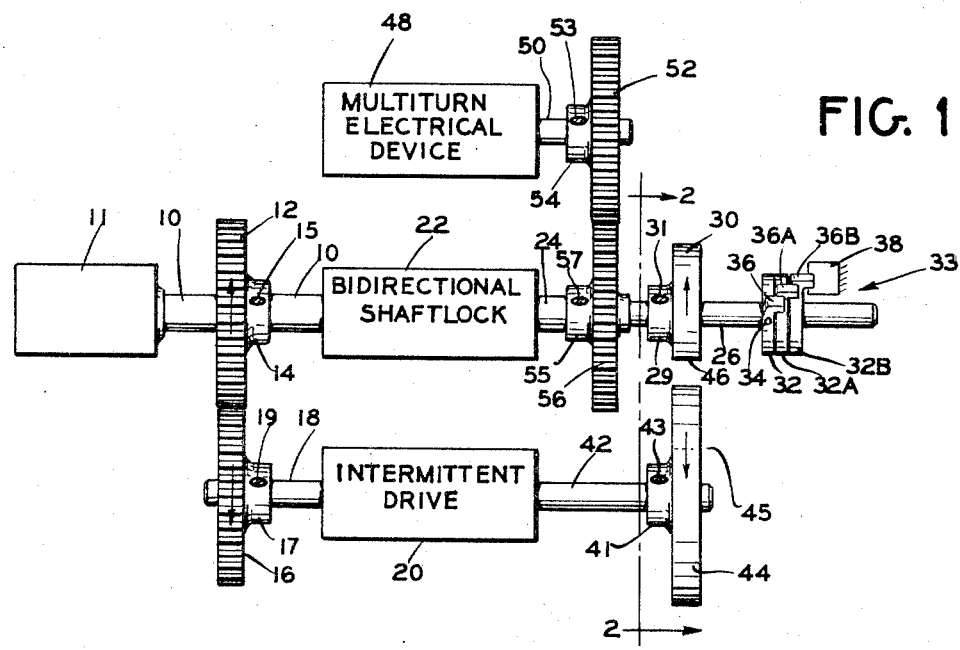
FIGURE 1 is a schematic representation illustrating the invention.

Referring to the drawing of FIGURE 1, the input shaft 10 is driven by a prime mover 11 which may be of a conventional type. A gear 12 is drivingly connected on shaft 10 by means of a hub 14 and set screw 15. The gear 12 is arranged in meshing engagement with a second gear 16 drivingly connected by means of a hub 17 and set screw 19 to an input shaft 18 of an intermittent drive 20 which may be of a conventional type.

The gear 12 may be driven through the shaft 10 by the prime mover 11 which may, for example, be an analog computer gear train (not shown) used to accomplish a particular analog function. The input shaft 10 is part of a conventional bidirectional locking device 22, hereinafter referred to as shaft lock 22, which may be of a type similar to the self-locking coupling shown and described in the aforenoted U.S. Patent No. 3,232,124 of G. A. Weber, but preferably of a type known as a nonreversing coupler such as distributed by the Automatic Locking Devices Incorporated of Bridgeport, Conn., and which shaft lock 22 has three concentric accessible shafts, the input shaft 10, an output shaft 24 and a locking shaft 26 extending through the output shaft 24. The bidirectional locking device or shaft lock 22 includes operative means of conventional type through which the output shaft 24 is rotated concurrently and in the same direction of rotation as the input shaft 10 so long as the locking shaft 26 is free to turn, which condition may be called the drive mode of operation of the shaft lock 22 in which the output shaft 24 and locking shaft 26 follows the rotation of the input shaft 10.

However, should the locking shaft 26 be prohibited from rotation, which condition may be called the locked mode of operation of the shaft lock 22, the output shaft 24 becomes locked to the locking shaft 26 through the operative means of the shaft lock 22 while the operative means of the shaft lock 22 permits the input shaft 10 to overrun in either direction without effecting further movement of the output shaft 24.

Figure 2:
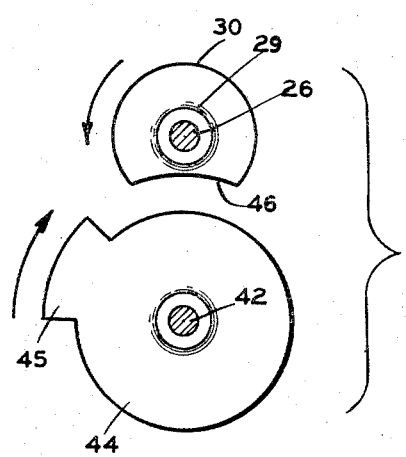
FIGURE 2 is a front plan view of the locking disks of FIGURE 1 in a disengaged position.

A locking disk 30, shown particularly in FIGURE 2, is fixedly mounted on the locking shaft 26 by a hub 29 and set screw 31 while a multiturn stop 33 which may be of a conventional type such as disclosed in the aforenoted U.S. Patent No. 3,232,124 includes an L-shaped plate 32 fixedly mounted by a set screw 34 on the locking shaft 26 for rotation therewith. Arranged in cooperative relation with the L-shaped plate 32 are corresponding L-shaped plates 32A and 32B movably mounted on the locking shaft 26. The plates 32, 32A and 32B of the multiturn stop 31 include projecting lugs 36, 36A and 36B, respectively, extending therefrom in an axial direction. The projecting lug portions 36, 36A and 36B have a length slightly less than the thickness of the adjacent cooperating plates 32A and 32B so that the lug serves to pick up only the adjacent plate.

The plates 32A and 32B are stacked on the shaft 26 and may be of a multiplicity in number so arranged as to permit relative rotation of one to another and whereby the last lug projection 36B may engage a stop pin 38 carried by the housing or frame of the system. The plates 32 having the lugs 36 provides a simple multiturn stop 33 and a mechanical structure to stop rotation of locking shaft 26 after a predetermined number of revolutions dependent upon the number of plates 32 and the width of the lugs 36 extending therefrom.

The intermittent drive 20 is of a conventional step down rotary type whereby a high number of revolutions of the input shaft 18 intermittently actuates an output shaft 42 causing a rotational displacement, for instance, of one or less revolutions of the output shaft 42. The output shaft 42 is used to position a locking disk 44 fixedly mounted thereof by a means of a hub 41 and set screw 43 and has a projecting portion 45, as shown by FIGURE 2, so arranged as to be positioned into a recess portion 46 of the locking disk 30 so as to cause the disks 30 and 44 to engage each other in a locking relation so as to effectively lock the shaft 26 from rotation.

The locking disk 30 is affixed to the locking shaft 26 by the hub 29 and set screw 31 and is effective to prohibit rotation of the shaft 26 in either direction upon the locking disk 44 being in the engaged position with the locking disk 30 so as to thereupon prevent rotation of the output shaft 24 upon rotation of the input shaft 10 of the shaft lock 22.

Upon the locking disk 44 being in the disengaged position relative to the disk 30, as shown by FIGURE 2, and the multiturn stop 33 being in a disengaged relation, an electrical device 48, such as a potentiometer or synchro, may be driven by the output shaft 24 following the rotation of the input shaft 10 of the shaft lock 22. The multiturn electrical device 48 has an input shaft 50 to which there is affixed a gear 52 by means of a hub 54 and a set screw 53. The gear 52 is arranged in meshing engagement with a gear 56 fixedly mounted by a hub 55 and set screw 57 on the output shaft 24. It will be seen that the shaft 50 of the multiturn electrical device 48 will be controlled by the rotation of the output shaft 24 in a ratio determined by the respective ratios of the gears 52 and 56.

OPERATION

In operation, input shaft 10 and gear 12 are suitably driven by a prime mover 11, such as a computer gear train, which simultaneously drives shaft 18 through the gear 16 mounted on the shaft 18 and drivingly engaged by the gear 12. The shaft 18 in turn provides an input shaft for the intermittent drive 20.

The other input shaft 10 drives through the shaft lock 22 the output shaft 24 and the locking shaft 26 a number of revolutions which is predetermined by the number of plates 32 of the multiple turn stop 33 stacked on the shaft 26. Upon a stacked fixed contact of the lugs 36 of the plates 32, each in respective contact with the adjacent plate 32, the locking shaft 26 is prohibited from further angular motion in the initial sense by the multiturn stop pin 38 engaging the last projecting lug 36B, as shown by FIGURE 1.

The shaft 26 having been rotated in an initial sense the predetermined number of revolutions, the shaft 26 is thereupon prohibited from further angular rotation. The initial rotation, as shown in FIGURE 1, is determined by the stack position of plates 32 and, as viewed looking in an axial direction from input to output, in the direction of arrows 2—2, there would arise an initial counterclockwise rotation of the input shaft 10 effecting a corresponding counterclockwise rotation of the output shaft 24, as well as a counterclockwise rotation of the locking shaft 26, as viewed in FIGURE 2.

Upon the multiturn stop 33 effectively locking rotation of the locking shaft 26 in the counterclockwise direction, the operating means of the shaft lock 22 acts to automatically lock output shaft 24 to locking shaft 26 so as to prohibit further rotation of the output shaft 24 in the counterclockwise direction, although the input shaft 10 may overrun in such counterclockwise direction.

For example, if the shaft 50 of the multiturn electrical device 48 has a limit of ten revolutions, the output shaft 24 must be locked to shaft 26 by the stacking contact of the plates 32 after ten revolutions of the input shaft 10 since output shaft 24 and locking shaft 26 rotate the same amount during this interval, after which the output shaft 24 would be locked by the operative means and locking shaft 26 of the shaft lock 22 so as to prohibit further rotation of gear 52 driving shaft 50 of the multiturn electrical device 48.

The intermittent drive 20 of a conventional rotary motion type may be so set that ten revolutions of the input shaft 18 causes a clockwise rotation of the output shaft 42 and locking disk 44 from the position shown in FIGURE 2 in the direction of the arrow. The locking disk 44 is operatively affixed to shaft 42 so as to turn or rotate therewith. The shaft 42 is intermittently driven in rotation after a predetermined number of revolutions of the input shaft 18 so as to move the locking disk 44 into mating position with the locking disk 30 immediately after the locking shaft 26 has become stopped from rotation by the action of the multiturn stop 33 including stacked lugs 36 of plates 32, each arranged in cooperative engagement with the adjacent lug, the last lug 36B engaging the adjacent stop pin 38.

At such locked position of the locking shaft 26 the output shaft 42 is prevented from further counterclockwise rotation by the multiturn stop 33 and the recess portion 46 of the locking disk 30 is positioned, as shown by FIGURE 2, for engagement by the projecting portion 45 of locking disk 44 in adjacent relation thereto. The engagement of the disks 30 and 44 in such a locking relation thereupon prevents rotation of the locking disk 30 and locking shaft 26 in either direction. If the input shaft 10 continues to further revolve in the counterclockwise direction and after the ten initial revolutions which rotated shaft 50 of the electrical device 48, output shaft 24 remains locked to the locking shaft 26 which is prohibited from further rotation in the counterclockwise direction.

Further, the intermittent drive 20 having caused the locking disk 44 to be rotated in a clockwise direction from the position shown in FIGURE 2 to the locking position with the locking disk 30 maintains the locking shaft 26 in a fixed locked position. Upon subsequent rotation of the input shaft 10 in the reverse direction, that is, in a clockwise direction as viewed looking from input to output, the locking shaft 26 and output shaft 24, which otherwise would be free, remain locked until the locking disk 44 moves out of engagement with the locking disk 30. The intermittent drive 20, depending upon the number of gears and teeth per gear, may be designed for any step down ratio such as 2,000:1 wherein 500 turns of the input shaft 18 would turn shaft 42 and locking disk 44 one-fourth or less of a revolution as required for engagement with locking disk 30. Further, the intermittent drive 20 may be initially set to turn the output shaft 42 the one-quarter turn after any desired number of revolutions of the input shaft 18 and thereafter automatically operate according to the step down ratio.

It is contemplated that the gear 16 will not be driven the further large number of additional revolutions which would be required to again rotate the shaft 42 and locking disk 44 another quarter revolution and out of engagement with the disk 30. The intermittent rotary motion drive 20 may be set to cause the movement of locking disk 44 into locking engagement with the disk 30 after a predetermined number of revolutions and angular movement of the input shaft 18 of the intermittent drive and to thereafter remain in the locking relation for a large number of revoltuions of the intermittent drive input shaft 18.

In the aforenoted example, the intermittent rotary motion drive 20 may actuate the locking disk 44 from the position shown in FIGURE 2 in the direction of the arrow to a mating position with locking disk 30 immediately following the locking of the shaft 26 by the multiturn stop 33 with the disk 30 in the position shown by FIGURE 2, and thereafter following the locking of disk 30 by disk 44 continued rotation of the intermittent drive input shaft 18 in the initial sense will not effect further movement of the locking disk 44 with respect to the disk 30. The locking disk 44, once in engaging position with disk 30, remains in its position although the intermittent drive input shaft 18 driven by gear 16 continues to rotate in the initial sense. The locking disk 44 in the locking engagement with the locking disk 30 prohibits rotation of the locking shaft 26 in either direction.

In FIGURE 1 the locking shaft 26 is shown in a locked position relative to the multiturn stop 33 caused by the previous counterclockwise rotation of the output shaft 24 and locking shaft 26, as viewed in FIGURE 2 looking in the direction from the input to the output, whereupon the projecting lugs 36, 36A and 36B of the plates 32, 32A and 32B are stacked against each other and the lug 36B of the last plate 32B is in contact with the stop pin 38. Thereafter upon the succeeding engagement of the disk 30 by the disk 44 in the engaging relation continued rotation of the input shaft 10 in the initial counterclockwise sense will not effect rotation of either shafts 24–26 or shaft 42, and thereafter following such additional rotation of the input shaft 10 in the initial counterclockwise sense, a reverse rotation of the input shaft 10 in a clockwise direction from such last additional adjusted position, will not effect an immediate angular adjustment of either shafts 24–26 or 42. This will be true because while locking shaft 26 will not be restrained by the multiturn stop 33 in the reverse direction it will be restrained by the engagement of the locking disk 30 with the locking disk 44. Moreover, the locking disk 44 will remain in the locking position for a reverse angular movement or number of counter revolutions corresponding to that at which the locking disk 44 was positioned into locking engagement with disk 30 whereupon thereafter disk 44 of FIGURE 2 will be rotated in counterclockwise direction and removed from the engagement with locking disk 30.

The reverse movement of the disk 44, to the position, as shown in FIGURE 2, thereupon releases the disk 30 and the locking shaft 26 so as thereupon allow the output shaft 24 to follow the reverse rotational movement of the input shaft 10 in a clockwise direction, as viewed looking from the input to the output. Upon the rotation of the output shaft 24 following the input shaft 10, gear 56 in gear meshing relation with the gear 52 drives the shaft 50 of the electrical device 48 in the opposite direction from that which it was caused to move initially upon the rotation of the shaft 10, 24 and 26 in the counterclockwise direction.

Upon the predetermined number of turns of counter rotation of the input shaft 10, output shaft 24 and locking shaft 26, the lugs 36 of the plates 32 will again engage and contact each other and finally engage the stop pin 38 at the opposite side from that shown in FIGURE 1 and similarly cause the locking shaft 26 to stop rotation thereby locking the output shaft 24 to it so as to prohibit further rotational motion of the output shaft 24 although the input shaft 10 may continue to rotate in a similar sense to that heretofore described.

What is claimed is:

1. In a positioning device of a type including a bidirectional locking device having a first input shaft, a first output shaft and a locking shaft, the bidirectional locking device including, means permitting rotation of the locking shaft and the first output shaft with the first input shaft, and said means permitting the first input shaft to rotate free of the first output shaft upon the locking shaft being restricted from rotation in a first sense, the improvement comprising:

intermittent drive means including a second input shaft, means for driving said second input shaft in a corresponding relationship with said first input shaft, and said intermittent drive means including a second output shaft intermittently responsive to rotation of the second input shaft;

a first locking means mounted on said locking shaft and rotatable therewith;

a second locking means mounted on said second output shaft and rotatable therewith, the intermittent drive being effective to intermittently rotate the second ouput shaft and thereby the second locking means into an engaging locking relation with the first locking means after a predetermined angular movement of the second input shaft in corresponding relation with the first input shaft and thereafter effective upon an additional angular movement of said first and second input shafts in said first sense to cause said second locking means to engage said first locking means to prevent angular movement of the locking shaft in said first sense and in a second opposite sense.

2. The combination defined by claim 1 in which:

the first and second locking means having means which disengage upon angular rotation of the second input shaft in a second opposite sense corresponding to the additional angular movement of the first and second input shafts in said first sense to allow rotation of said locking shaft and then said first output shaft in said opposite second sense.

3. The combination defined by claim 2 wherein:

the first locking means includes:
a first locking disk mounted on said locking shaft and rotatable therewith; and the second locking means includes:
a second locking disk mounted on said second output shaft and rotatable therewtih for engagement with the first locking disk to prevent rotation thereof in said first and second senses.

4. The combination defined by claim 1 including stop means effective upon angular movement of the first input shaft in the first sense to limit the resulting movement of the locking shaft in said first sense as well as the first locking means to a position adapted for engagement by said second locking means upon subsequent rotation of the second locking means into said engaging locking relation.

5. In a limit drive device of a type having a rotatably driven output shaft slaved to a driving input shaft rotatable in one direction for a predetermined angular extent, first means to lock the output shaft thereafter in one sense in a fixed position at said predetermined angular extent, and means to allow the input shaft to continue to rotate in the one direction free of said output shaft; the improvement comprising:

second locking means including first and second disks which interlock to restrain the output shaft from rotation in both said one sense and in an opposite sense after an additional angular adjustment of the input shaft in said one sense following the locking of the output shaft by said first locking means.

6. The combination defined by claim 5 wherein the first locking disk is mounted for rotation with the output shaft of the limit drive device; and the second locking disk engages the first locking disk to restrain rotation of the output shaft in said one and opposite senses, and the second locking disk also includes:

means to intermittently rotate the second locking disk into locking engagement with the first disk upon a predetermined angular adjustment of the input shaft of the limit drive device.

7. The combination defined by claim 6 wherein the means to intermittently rotate the second locking disk includes:

an input shaft for the intermittent means driven in corresponding relation with the driving input shaft of the limit drive device;

an output shaft for the intermittent means mounting the second locking disk and intermittently rotatable according to a predetermined angular rotation of the intermittent drive input shaft, and the intermittent means being arranged to rotate the intermittent drive output shaft and the second locking disk into the locking engagement with the first locking disk at the predetermined angular adjustment of the input shaft of the limit drive device.

8. A shaft positioning device comprising:

an input shaft selectively rotatable in opposite senses, an output shaft rotatable with the input shaft during rotation of the input shaft in one sense;

first locking means to maintain the output shaft in a fixed position during rotation of the input shaft beyond a predetermined angle;

means to allow the input shaft to rotate in both senses free of said output shaft beyond the predetermined angle; and second locking means including first and second disks interlocking to restrain the output shaft from rotation in an opposite sense until an angular rotation of the input shaft in the opposite sense equal to the angular rotation of the input shaft in the one sense has occurred.

9. The combination defined by claim 8 wherein:

the first locking disk is mounted for rotation with the output shaft of the shaft positioning device; and the second locking disk engages the first locking disk to restrain rotation of the output shaft in said one and opposite senses; and the locking means also includes:

means to intermittently rotate the second locking disk out of locking engagement with the first disk upon an angular adjustment of the input shaft of the shaft positioning device in the opposite sense equal to the angular rotation of the input shaft in the one sense.

10. The combination defined by claim 9 wherein the means to intermittently rotate the second locking disk includes:

an input shaft for the intermittent means driven in corresponding relation with the input shaft of the shaft positioning device;

an output shaft for the intermittent means mounting the second locking disk and intermittently rotatable according to a predetermined angular rotation of the intermittent drive input shaft, the intermittent means being arranged to rotate the intermittent drive output shaft and the second locking disk out of locking engagement with the first locking disk upon an angular adjustment of the input shaft of the shaft positioning device in the opposite sense equal to the angular rotation of the input shaft in the one sense.

11. A limited drive device comprising:

an input shaft;
an output shaft;
a shaft lock drivably connecting the input and the output shafts and when operated releasing the driving connection between the input and output shafts and locking the output shaft against rotation but allowing the input shaft to continue rotating;
means for operating the shaft lock when the output shaft is rotated through a predetermined angle to allow the input shaft to overrun the predetermined angle;
means for locking the operating means; and
means for actuating the locking means only during overrun of the input shaft whereby the output shaft remains locked during overrun of the input shaft and the output shaft is released and is drivably connected to the input shaft when the input shaft returns to the predetermined angle.

References Cited

UNITED STATES PATENTS 3,140,618  7/1964  Russell  74—10.2

MILTON KAUFMAN, *Primary Examiner.*